(12) United States Patent
Glaser et al.

(10) Patent No.: US 11,546,445 B2
(45) Date of Patent: Jan. 3, 2023

(54) METHOD AND SYSTEM FOR UNIVERSAL SECURITY SERVICES ABSTRACTION

(71) Applicant: salesforce.com, inc., San Francisco, CA (US)

(72) Inventors: Scott Glaser, Dublin, CA (US); Abhinav Bagul, Dallas, TX (US); Kerry Fleming, Plano, TX (US); Matthew R. Kunkel, San Francisco, CA (US); Derek Spiner, El Cerrito, CA (US)

(73) Assignee: salesforce.com, inc., San Francisco, CA (US)

( * ) Notice: Subject to any disclaimer, the term of this patent is extended or adjusted under 35 U.S.C. 154(b) by 106 days.

(21) Appl. No.: 17/204,880

(22) Filed: Mar. 17, 2021

(65) Prior Publication Data
US 2022/0303348 A1 Sep. 22, 2022

(51) Int. Cl.
*H04L 67/566* (2022.01)
*H04L 9/40* (2022.01)
*H04L 67/561* (2022.01)
*H04L 67/564* (2022.01)

(52) U.S. Cl.
CPC .......... *H04L 67/566* (2022.05); *H04L 63/10* (2013.01); *H04L 63/168* (2013.01); *H04L 67/561* (2022.05); *H04L 67/564* (2022.05)

(58) Field of Classification Search
CPC .......................... H04L 63/166; H04L 67/566
See application file for complete search history.

(56) References Cited

U.S. PATENT DOCUMENTS

| | | | |
|---|---|---|---|
| 7,730,478 B2 | 6/2010 | Weissman | |
| 8,739,126 B2 | 5/2014 | Glaser et al. | |
| 8,868,981 B2 | 10/2014 | Glaser et al. | |
| 8,903,943 B2 | 12/2014 | Glaser et al. | |
| 9,229,934 B2 | 1/2016 | Mankala et al. | |
| 9,563,680 B2 | 2/2017 | Mankala et al. | |
| 9,658,933 B2 | 5/2017 | Vyas et al. | |
| 10,114,737 B2 | 10/2018 | Ramakrishna et al. | |
| 10,261,890 B2 | 4/2019 | Gandham et al. | |
| 11,019,104 B2 * | 5/2021 | Luo | H04L 63/0227 |
| 2017/0041206 A1 * | 2/2017 | Maes | H04L 41/5051 |

* cited by examiner

*Primary Examiner* — Esther B. Henderson
(74) *Attorney, Agent, or Firm* — Nicholson De Vos Webster & Elliott LLP

(57) ABSTRACT

A method for providing interoperability between a plurality of security services and target applications by an interoperability service. The method includes receiving a request from one of the plurality of security services to perform a task on a target application, preparing a unified data model for interaction with the target application, determining and organizing data connections to perform the task on the target application, generating a set of requests using the unified data model based on the task and utilizing business logic of the interoperability service for the data connections with the target application, transforming the set of requests into commands and data structures specific to the target application, and sending the set of requests on respective data connections with the target application.

21 Claims, 6 Drawing Sheets

METHOD AND SYSTEM FOR UNIVERSAL SECURITY SERVICES ABSTRACTION

TECHNICAL FIELD

One or more implementations relate to the field of security services; and more specifically, to methods and systems for supporting multiple security services for a platform via an abstraction layer.

BACKGROUND ART

Online platforms support large numbers of users, organizations, and applications. These online platforms can rely on separate security services to perform functions for enabling the users, organizations, and applications to securely utilize the resources of the online platform. However, each security service utilizes a set of separate proprietary interfaces, protocols, connectors and similar components to interact with the online platform, users, organizations, and other security services. These security services do not provide a composable, reusable, or scalable way to connect their services to target applications, data, users, organizations, and other security solutions.

Each security service works in a silo with each application that the security service provides a service to. Each security service utilizes a connection that needs to be replicated for each application as well as any partnering security product it integrates. The connections that are provided by the security services are point to point integration with minimal reusability and scalability. If the provided connector does not fit the requirements of the platform or application the only option is to create a custom connector which adds complexity and cost to the use of the security service in connection with the platform. This issue makes the use of custom connectors and similar solutions inflexible and non-reusable in large scale implementations. In addition as more connections between security services and applications and other aspects of the platform are created it puts a high load and stress on the security service with no way to distribute the load other than to add more security service servers. This creates performance limitations, increases management, and increases cost.

Security services can provide a range of services including identity governance and administration (IGA) and identity and access management (IAM). IGA is a service that implements policies for identity management and access control. IGA services can combine identity governance processes with identity administration processes for a wide range of security processes. IGA can be implemented to support auditing, legal compliance requirements in certain jurisdictions, and similar services. IGA and similar security services are in increasing demand as users access a wide array of applications and resources provided by online platforms where the users can be connecting from a wide range of devices and locations.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for a method and system for a universal security services manager. The universal security services manager fills a gap in enabling platforms to support multiple security services for users, organizations, and applications provided by the platform. Further, the universal security services manager provides a composable and securely connected application network to provide security services such as identity and access management services across the platform. This application network acts as the connection layer to allow any security service to connect to target applications as well as to each other in a modular, reusable, and scalable way.

The universal security services manager provides an abstraction layer designed with reusability, flexibility, and scalability to alleviate the repetitiveness and limitation of creating isolated and custom connections from applications being managed by a security service. Examples of security services include Identity IQ (IIQ) by SailPoint Technologies Holdings, Okta services by Okta, Inc., Vault by HashiCorp, Cybersource by Visa, Inc., and similar services. The universal security services manager removes the need to replicate point to point connections form security services to applications and provides a flexible, extendable, performant shared application network. The advantage of using an abstraction layer is to allow any security service to connect to any application or other security service as needed while distributing the processing power to do the work to the abstraction layer. In some implementations, the abstraction layer is composed of an application programming interface (API) led three tier architecture focused around composable reusable components that build a secure application network. The components can communicate to one another through any protocol or mechanism. In one implementation, the components communicate using the system for cross-domain identity management (SCIM) protocol while connecting to the target applications through various network communication methods (REST, SOAP, LDAP, JDBC, flat file, and similar technologies) leveraging integration systems such as MuleSoft software by MuleSoft, LLC based on APIs. The abstraction layer can also enable integrations (e.g., services) to be executed in other programming languages (e.g., Java, Python, Javascript, and similar programming languages). Integrations/services in various programming languages can be executed through a service mesh.

Figure 1:
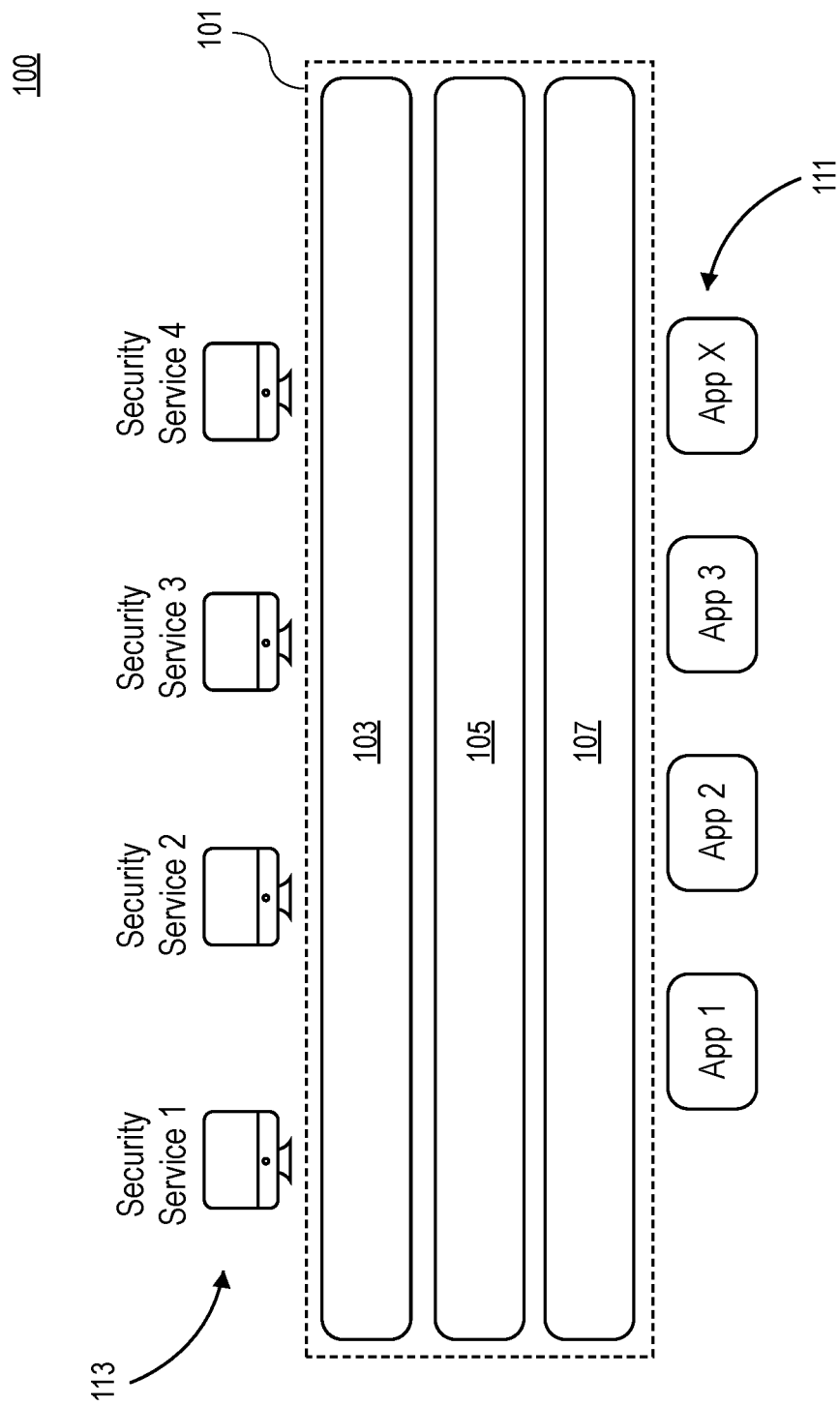
FIG. 1 is a block diagram illustrating security services for a platform according to some example implementations.

FIG. 1 is a block diagram illustrating security services for a platform according to some example implementations. In the illustrated example, a platform 100 supports a set of applications 111 (e.g., Apps 1-X), which can be any type and combination of applications that service users of the platform 100. A 'set,' as used herein refers to any positive whole number of items including one item. The applications 111 can be any type, variety, or combination of software applications supported by a platform 100. The platform 100 can be any type of online computing environment that supports the execution of applications 111 on behalf of a set of users, organizations, and similar entities. The platform 100 can be a set of computing resources including any number and variety of computing systems, electronic storage, networking devices and infrastructure and similar components that enable the execution of the applications 111, security services 113, and other components of the platform 100. For sake of clarity and conciseness other components of the platform 100 are not illustrated.

The applications 111 can be accessed and utilized by a set of users, organizations, and similar entities that utilize the platform 100 (e.g., as subscribers or similar contractual relations). The applications 111 can offer any range of services to the user such as customer relations management (CRM), sales management, and similar often enterprise oriented services. The applications 111 can utilize any one or more of the security services 113. The security services 113 can offer services related to IGA or similar services. The security services 113 are structured such that direct connections between each application 111 and each security service 113 can be formed. However, establishing these direct connections is not scalable or reusable. Further, this requires that the security services 113 and applications 111 each have specific coding to establish the connection, which is specific to the respective security service 113 and/or application 111.

The implementations described herein, provide an abstraction layer 101 referred to herein as a universal security services manager 101 that enables the applications 113 and applications 111 to form connections between themselves that are not specific to the security service 113 and/or application 111. Further, the universal security services manager 101 can manage and load balance these connections between the applications 111 and the security services 113. In some implementations, connections between the security services 113 can also be supported by the universal security services manager 101. In some implementations, the universal security services manager 101 can include internal layers that handle different aspects of the connections between the security services 113 and/or applications 111. Examples of implementations of the layers 103-107 are described herein below. The universal security service manager 101 is software, e.g., middleware or similar software infrastructure that is provided by the platform 100.

Figure 2:
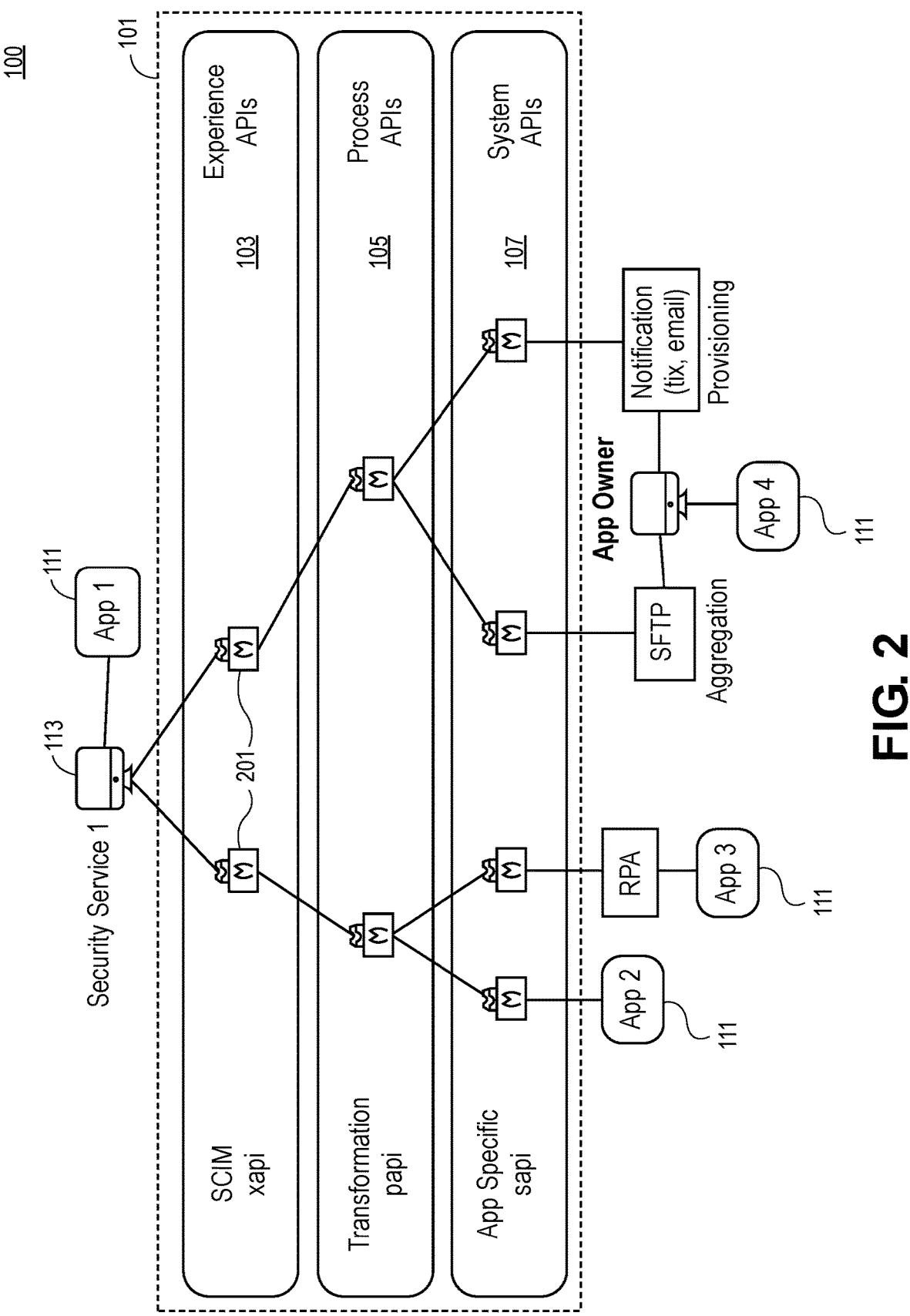
FIG. 2 is a block diagram illustrating a more detailed security services configuration using a universal security services manager according to some example implementations.

FIG. 2 is a block diagram illustrating a more detailed security services configuration using a universal security services manager according to some example implementations. The universal security services manager 101 provides an abstraction for connections between the security services 113 and other components that is modular. In the illustrated implementation, the universal security manager 101 is implemented as a set of layers including an experience layer 103, process layer 105, and system layer 107. Each of these layers can be implemented as a set of APIs. Further, the functions of the layers and APIs can be implemented via microservices 201. Each layer provides another level of abstraction. The abstraction layers enable like process to be grouped together. Each layer provides a specific functionality allowing specific job functions to attend to each layer. As an example, one layer can relate to system owners with functions that take care of system APIs, another layer can relate to process/logic engineering that takes care of process APIs. A further layer can relate to user experience that takes care of experience APIs. Since each API or group of APIs is contained into a microservice they operate independently of another microservice. This organization of APIs enables the APIs to be upgraded, expanded, replaced, or deprecated without affecting other microservices contained in the abstraction layer.

A microservice 201 can be a process that communicates over a network or within a platform 100 with other components to fulfil a goal using general or technology-agnostic protocols Microservices 201 can be implemented using any variety and combination of different programming languages, databases, hardware, and software environments. Microservices 201 are small in size, messaging-enabled, bounded by contexts, autonomously developed, independently deployable, decentralized, instantiated by automated processes and have similar qualities.

The use of abstraction layers 101 and microservices 201 provides compartimization of risk and reduces load on the machines that execute the microservices 201 as well as those that execute the security services 113 and applications 111. The layers 101 of the universal security services manager can be localized APIs (API's deployed in a target friendly network/environment). The layers 101 can support multi-connections with support for any connection type for either provisioning or aggregation. The layers 101 also de-couple systems, which unlocks data from target systems to be utilized elsewhere in the platform.

In the illustrated example, a set of applications 111 connect with a security service 113 via the universal security services manager 101. The security service 113 in this example connects with four applications (App1-App4), where App1 connects with a direct connection without the use of the universal security services manager 101. The other applications APP2-4 connect via the universal security services manager 101. In the example implementation, the universal security services manager 101 is implemented with three layers of abstraction (103-107). Applications 111 can be connected to other applications and components. In the illustrated example, the App3 is connected to an abstraction layer of the universal security services manager 101 via robotic process automation (RPA). App4 is connected via secure shell file transfer protocol (SFTP) for aggregation and email components for provisioning. Any variation or configuration of applications and intermediate components, protocols, or technologies can be supported by the universal security services manager 101.

However, one skilled in the art would appreciate that the abstraction can be organized into any number of layers including a single layer. Further, there can be any number of APIs or applications in each of the three Layers (Experience 103, Process 105, and System 107). As used herein, an API is a composable and reusable service performing a single responsibility that can be leveraged by multiple processes or components in the platform. APIs are divided into the three layers depending on the functions needed to create scalable reusable components to provide a process flow. The experience layer 103 manages how requests/responses should be routed through the process layer 105, even if the experience layer 103 is passing direct values or data to the process layer 105. Across the layers 101 the data types and actions can be standardized. Combinations of existing APIs at each layer can be reused to form new process flows with none to minimal development of new APIs or related functions. Since each API provides a specific functionality that is small in nature, similar functionality can then be mirrored or templatized from another similar API.

As used herein, a data model refers to an object representation with defined fields, clear definitions of what those fields contain, and clear definitions of how those fields are represented. Further, as used herein, actions refer to clear definitions of rules in how to interact with a system, application, service or platform that provides a data model.

Figure 3:
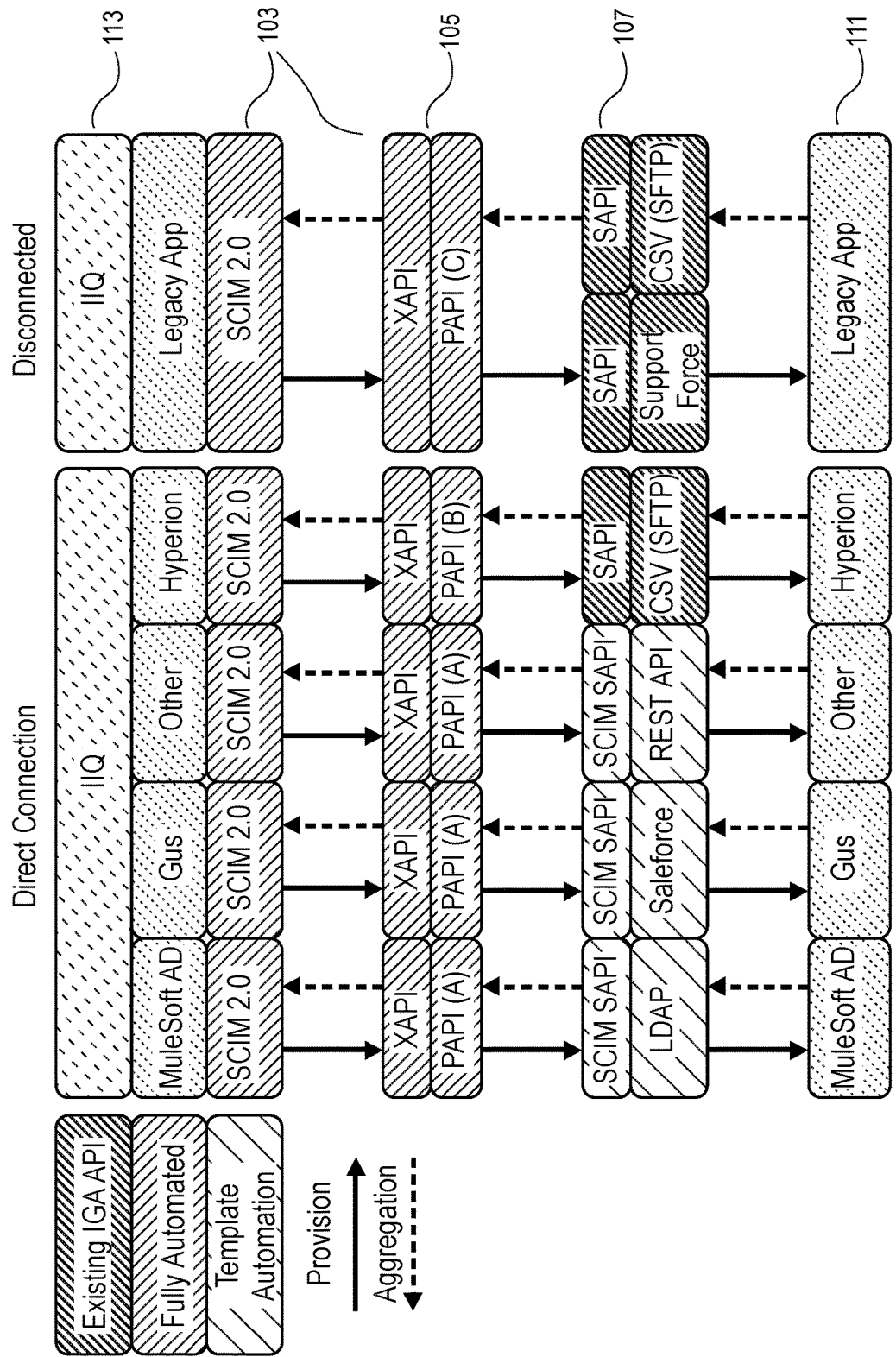
FIG. 3 is a block diagram illustrating a specific example implementation of a universal security services manager.

FIG. 3 is a block diagram illustrating a specific example implementation of a universal security services manager. In this example the security services 113 are IIQ services where one instance is in direct connection with a set of applications 111 via the universal security services manager via the layers 103-107. Another instance is indirectly connected or disconnected via the universal security services manager 101. The target applications 111 include Gus, Hyperion, MuleSoft AD, and similar applications that may utilize IIQ including legacy applications. In this example implementation, the experience layer 103 is interfaced with via SCIM (e.g., SCIM 2.0). The experience layer 103 is further implemented by an experience API (XAPI). The process layer 105 is implemented in this example and process API (PAPI) (A-C) depending on the target application there may be differing instances, configurations, or implementations with differing flow logic. The system layer 107 is implemented in this example via the system API (SAPI) or a SCIM based SAPI (SCIM SAPI), which interfaces with the target applications via interfaces or protocols specific to the target applications (e.g., LDAP, Salesforce, REST, CSV (SFTP), Support Force or similar technologies or protocols. In the example implementation, a representation of the target applications 111 are shown proximate to the security services indicating a view of the security service (e.g., IIQ) as interfacing with the target application with a direct connection, such that the universal security services manager 101 and the abstraction layers are transparent to the security service 113 and the target applications 111. In implementations where SCIM is utilized, the abstraction layer can utilize SCIM as the preferred protocol when communicating with security services. The abstraction layer can have specific features to automate the reusability of SCIM capabilities. This provides maximum reusability since SCIM supports identity management related security services.

Figure 4:
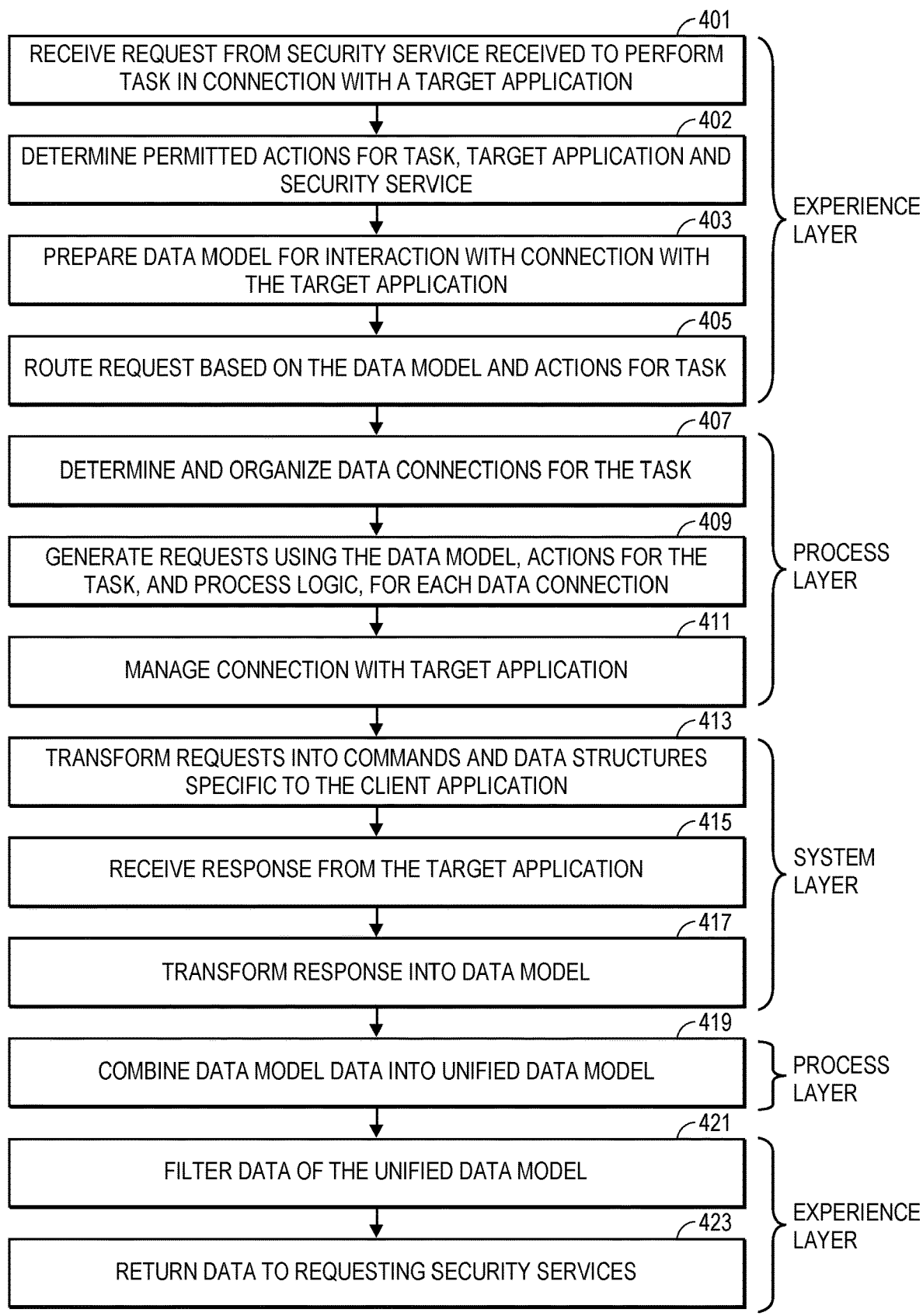
FIG. 4 is a flow diagram illustrating request handling by the abstraction layer according to some example implementations.

FIG. 4 is a flow diagram illustrating request handling by the abstraction layer according to some example implementations. In the example implementation, the experience layer 103 receives an incoming request from a requesting security service (e.g., IIQ) (Block 401). The request can be a request for the target application to perform a task, function or action. In response, the experience layer 103 will perform an authentication check and allows all or only certain defined actions based on either implementation or the use of an authentication process (e.g., Oauth). The experience layer 105 thus makes a determination of the permitted set of actions that can be performed for the task based on the target application, security service, user, or similar considerations (Block 402). The experience layer 103 then prepares the data model for interaction with the connection between the target application and the security service (Blok 403). The experience layer 103 collects all or only certain subsets of the data model by interacting with the app, bots, or other experience API based on either implementation or the use of an authentication process such as Oauth. The experience layer 103 routes the request to the appropriate process layer 105 (e.g., specific microservices of the process layer 105) using the defined data model and actions that have been determined for the requested task (Block 405). In some implementations, the experience layer can send/receive data directly to the system layer based on the desired flow.

The process layer 105 receives the incoming request from the experience layer 103. The process layer 105 can also perform an authentication check. The process layer 105 can implement the relevant process logic. The process layer 105 can contain or have access to temporary storage and the ability to store and modify sets of data in required circumstances. The process layer 105 coordinates and combines the different required data connections and collections from the task to be implemented by the system layers 107 (Block 409). The process layer 105 creates an appropriate request to the system layer 107 using the defined data model and actions for the task, while following the process logic contained within the process layer 105 for each data connection (Block 409). The process layer 105 then works to manage the connection with the target application (Block 411).

The system layer 107 receives the incoming request from the process layer 105. The system layer 107 performs an authentication check, and makes a connection to the target system (i.e., that runs the target application) using the connection method preferred by the target application with credentials pre-configured in the system layer 107. Examples of the connection methods or types include Java database connectivity (JDBC), hyper-text transfer protocol (HTTP), and lightweight directory access protocol (LDAP). The system layer 107 transforms the requested pre-defined action(s) and data model into commands and data structures to action/commands and data structures that the target system and target application 111 can interpret and or execute (Block 413).

The system layer 107 receives a response from the target application that has implemented the performed action on the target system (Block 415). The target system translates the response from target application and target system into the defined data model (Block 417). The system layer 107 then responds back to the process layer 105 with the transformed data. The process layer 105 receives response from the system layer 107. The process layer 105 combines system layer data pieces into the unified data model (Block 419). The process layer 105 then returns the data formatted in the unified data model to the experience layer 103.

The experience layer 103 receives a response from process layer 105. The experience layer 103 then filters the data from the data model based on implementation details, or the use of an authorization process (e.g., Oauth) (Block 421). The experience layer then returns the filtered data in the data model back to the requestor (Block 423).

Thus, the embodiments provide a method and system for managing security systems connections that improves performance, scalability, onboarding efficiency, and reusability. The performance is improved compared against existing IGA aggregation times for similar sized data sets. The scalability is improved to demonstrate the underlying architecture has the ability to scale and meet future needs. Onboarding efficiency is improved where developer time required to onboard apps is decreased with and without existing templates. The reusability is improved by a demonstrated usage of templates to support the connections using SCIM standardization. Increased performance or throughput can be achieved in a flow by using some process layer services that contain embedded services (e.g., Kafka or Pulsar).

In some implementations, the universal security services manager is implemented to support applications, users, and security services in online platforms such as cloud based platforms, multi-tenant platforms, and similar environments. The term "user" is a generic term referring to an entity (e.g., an individual person) using a system, platform, and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 5A:
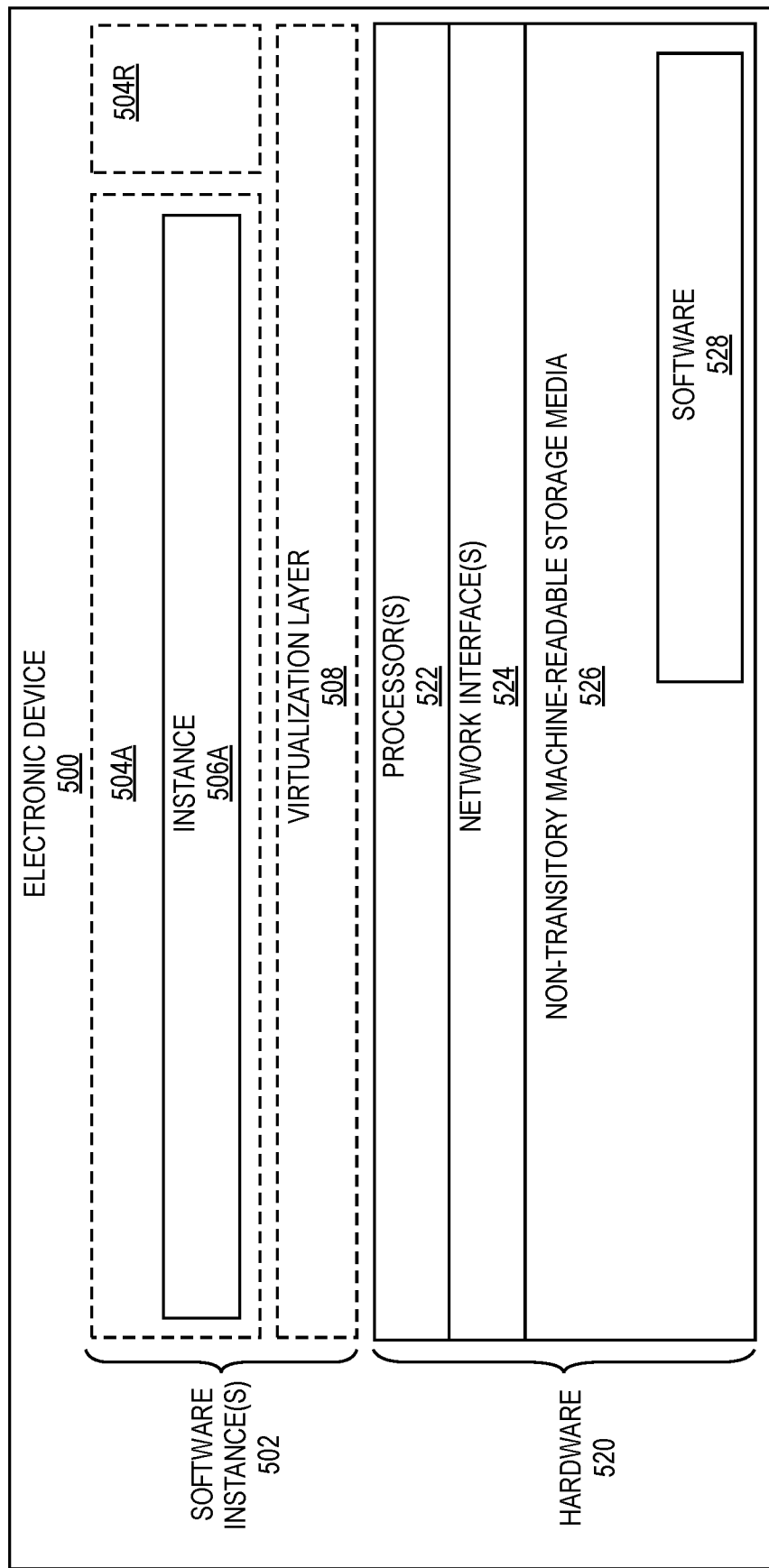
FIG. 5A is a block diagram illustrating an electronic device according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522). Each of the previously described end user target applications and the security services as well as the universal security services manager may be implemented in one or more electronic devices 500. In one implementation: 1) each of the end user clients is implemented in a separate one of the electronic devices 500 (e.g., in user electronic devices operated by users where the software 528 represents the software to implement end user clients to interface with the universal security services manager (e.g., a web browser, a native client, a portal, a command-line interface, and/or an application program interface (API) based upon protocols such as Simple Object Access Protocol (SOAP), Representational State Transfer (REST), etc.)); 2) the universal security services manager is implemented in a separate set of one or more of the electronic devices 500 (e.g., a set of one or more server electronic devices where the software 528 represents the software to implement the universal security services manager service); and 3) in operation, the electronic devices implementing the end user clients and the universal security services manager would be communicatively coupled (e.g., by a network) and would establish between them (or through one or more other layers) connections for submitting requests to the universal security services manager. Other configurations of electronic devices may be used in other implementations (e.g., an implementation in which the end user client and the universal security services manager are implemented on a single electronic device 500).

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

Exemplary Environment

Figure 5B:
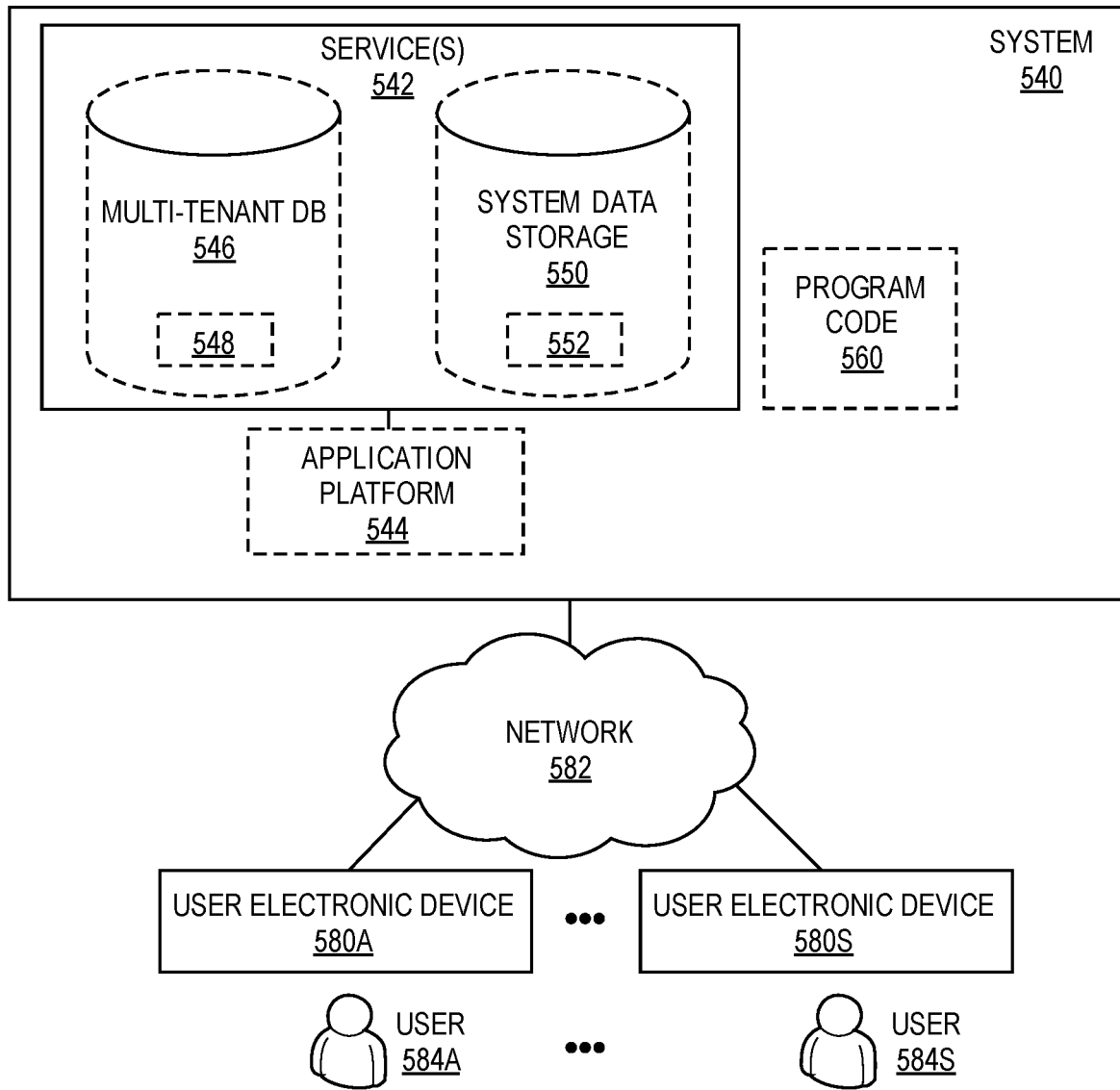
FIG. 5B is a block diagram of an environment where a universal security services manager may be deployed, according to some implementations.

FIG. 5B is a block diagram of an environment where a universal security services manager may be deployed, according to some implementations. A system 540 includes hardware (a set of one or more electronic devices) and software to provide service(s) 542, including the universal security services manager. The system 540 is coupled to user electronic devices 580A-S over a network 582. The service(s) 542 may be on-demand services that are made available to one or more of the users 584A-S working for one or more other organizations (sometimes referred to as outside users) so that those organizations do not need to necessarily be concerned with building and/or maintaining a system, but instead makes use of the service(s) 542 when needed (e.g., on the demand of the users 584A-S). The service(s) 542 may communication with each other and/or with one or more of the user electronic devices 580A-S via one or more Application Programming Interface(s) (APIs) (e.g., a Representational State Transfer (REST) API). The user electronic devices 580A-S are operated by users 584A-S.

In one implementation, the system 540 is a multi-tenant cloud computing architecture supporting multiple services, such as security services supported by the universal security services manager, customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 540 may include an application platform 544 that enables PAAS for creating, managing, and executing one or more applications developed by the provider of the application platform 544, users accessing the system 540 via one or more of user electronic devices 580A-S, or third-party application developers accessing the system 540 via one or more of user electronic devices 580A-S.

In some implementations, one or more of the service(s) 542 may utilize one or more multi-tenant databases 546 for tenant data 548, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user electronic device 580A-S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the one or more multi-tenant database 546 and/or system data storage 550.

In some implementations, the service(s) 542 are implemented using virtual applications dynamically created at run time responsive to queries from the user electronic devices 580A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the universal security services manager, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 540 and the user electronic devices 580A-S.

Each user electronic device 580A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 540. For example, the user interface device can be used to access data and applications hosted by system 540, and to perform searches on stored data, and otherwise allow a user 584 to interact with various GUI pages that may be presented to a user 584. User electronic devices 580A-S might communicate with system 540 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 580A-S might include an HTTP client, commonly referred to as a "browser," for sending and receiving HTTP messages to and from server(s) of system 540, thus allowing users 584 of the user electronic device 580A-S to access, process and view information, pages and applications available to it from system 540 over network 582.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for providing interoperability between a plurality of security services and target applications by an interoperability service, the method comprising:
   receiving a request from one of the plurality of security services to perform a task on a target application;
   preparing a unified data model for interaction with the target application;
   determining and organizing data connections to perform the task on the target application;
   generating a set of requests using the unified data model based on the task and utilizing business logic of the interoperability service for the data connections with the target application;
   transforming the set of requests into commands and data structures specific to the target application; and
   sending the set of requests on respective data connections with the target application.

2. The method of claim 1, further comprising:
   determining a permitted set of actions for the task, target application, and the one of the plurality of security services.

3. The method of claim 1, further comprising:
routing the request in the interoperability service based on the unified data model, and a set of actions for the task.

4. The method of claim 1, further comprising:
managing a set of data connections with the target application.

5. The method of claim 1, further comprising:
receiving response from target application;
transforming the response into a form consistent with the unified data model;
combining the response data into the unified data model; and
returning data to the one of the plurality of security services.

6. The method of claim 5, further comprising:
filtering data of the unified data model prior to returning the data to the one of the plurality of security services.

7. The method of claim 5, wherein the interoperability service includes multiple layers of abstraction including an experience layer, a process layer and a system layer.

8. A non-transitory machine-readable storage medium that provides instructions that, if executed by a processor, will cause said processor to perform operations of a method for providing interoperability between a plurality of security services and target applications by an interoperability service, the operations comprising:
receiving a request from one of the plurality of security services to perform a task on a target application;
preparing a unified data model for interaction with the target application;
determining and organizing data connections to perform the task on the target application;
generating a set of requests using the unified data model based on the task and utilizing business logic of the interoperability service for the data connections with the target application;
transforming the set of requests into commands and data structures specific to the target application; and
sending the set of requests on respective data connections with the target application.

9. The non-transitory machine-readable storage medium of claim 8, further comprising:
determining a permitted set of actions for the task, target application, and the one of the plurality of security services.

10. The non-transitory machine-readable storage medium of claim 8, further comprising:
routing the request in the interoperability service based on the unified data model, and a set of actions for the task.

11. The non-transitory machine-readable storage medium of claim 8, further comprising:
managing a set of data connections with the target application.

12. The non-transitory machine-readable storage medium of claim 8, further comprising:
receiving response from target application;
transforming the response into a form consistent with the unified data model;
combining the response data into the unified data model; and
returning data to the one of the plurality of security services.

13. The non-transitory machine-readable storage medium of claim 12, further comprising:
filtering data of the unified data model prior to returning the data to the one of the plurality of security services.

14. The non-transitory machine-readable storage medium of claim 12, wherein the interoperability service includes multiple layers of abstraction including an experience layer, a process layer and a system layer.

15. A computing device to execute an interoperability service between a plurality of security services and applications by an interoperability service, the computing device comprising:
a non-transitory machine-readable medium having stored therein the interoperability services; and
a processor coupled to the non-transitory machine-readable medium, the processor to execute the interoperability service, the interoperability service to receive a request from one of the plurality of security services to perform a task on a target application, prepare unified data model for interaction with the target application, determine and organizing data connections to perform the task on the target application, generate a set of requests using the unified data model based on the task and utilizing business logic of the interoperability service for the data connections with the target application, transform the set of requests into commands and data structures specific to the target application, and send the set of requests on respective data connections with the target application.

16. The computing device of claim 15, wherein the interoperability service is further to determine a permitted set of actions for the task, target application, and the one of the plurality of security services.

17. The computing device of claim 15, wherein the interoperability service is further to route the request in the interoperability service based on the unified data model, and a set of actions for the task.

18. The computing device of claim 15, wherein the interoperability service is further to manage a set of data connections with the target application.

19. The computing device of claim 15, wherein the interoperability service is further to receive response from target application, transform the response into a form consistent with the unified data model, combine the response data into the unified data model, and return data to the one of the plurality of security services.

20. The computing device of claim 19, wherein the interoperability service is further to filter data of the unified data model prior to returning the data to the one of the plurality of security services.

21. The computing device of claim 19, wherein the interoperability service includes multiple layers of abstraction including an experience layer, a process layer and a system layer.

* * * * *